(12) United States Patent
Onuma

(10) Patent No.: US 7,545,526 B2
(45) Date of Patent: Jun. 9, 2009

(54) PRINTER COMMAND CONTROL APPARATUS, METHOD AND SYSTEM, PRINTER TO BE CONNECTED TO THE SAME APPARATUS, AND PROGRAM AND STORAGE MEDIUM

(75) Inventor: Nobuo Onuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 10/314,991

(22) Filed: Dec. 10, 2002

(65) Prior Publication Data

US 2003/0137687 A1 Jul. 24, 2003

(30) Foreign Application Priority Data

Dec. 11, 2001 (JP) .............................. 2001-377944

(51) Int. Cl.
G06F 15/00 (2006.01)
G03B 21/56 (2006.01)

(52) U.S. Cl. ....................... 358/1.15; 358/1.14; 358/444

(58) Field of Classification Search ................ 358/1.15, 358/442, 402, 444, 1.1, 1.9, 1.18, 468, 1.16, 358/1.14

See application file for complete search history.

(56) References Cited

U.S. PATENT DOCUMENTS

| | | | | |
|---|---|---|---|---|
| 5,497,372 A | * | 3/1996 | Nankoh et al. ............... | 370/480 |
| 5,696,894 A | * | 12/1997 | Ono .......................... | 358/1.15 |
| 5,758,041 A | * | 5/1998 | Shimura .................... | 358/1.14 |
| 5,970,228 A | * | 10/1999 | Nezu ........................... | 726/34 |
| 6,209,030 B1 | * | 3/2001 | Ohashi ....................... | 709/219 |
| 6,288,799 B1 | * | 9/2001 | Sekiguchi ................... | 358/468 |
| 6,351,317 B1 | * | 2/2002 | Sasaki et al. ................ | 358/1.15 |
| 6,366,359 B1 | * | 4/2002 | Garland ...................... | 358/1.15 |
| 6,456,729 B1 | * | 9/2002 | Moore ......................... | 382/103 |
| 6,542,173 B1 | * | 4/2003 | Buckley ...................... | 715/841 |
| 6,628,417 B1 | * | 9/2003 | Naito et al. ................. | 358/1.15 |
| 6,658,219 B1 | * | 12/2003 | Ito et al. ........................ | 399/27 |
| 6,757,749 B2 | * | 6/2004 | Aoki et al. ....................... | 710/5 |
| 6,774,951 B2 | * | 8/2004 | Narushima .................. | 348/552 |
| 6,792,577 B1 | * | 9/2004 | Kimoto ....................... | 715/235 |
| 6,912,061 B1 | * | 6/2005 | Ozaki ......................... | 358/1.15 |
| 6,917,436 B2 | * | 7/2005 | Bates et al. ................. | 358/1.15 |
| 7,075,670 B1 | * | 7/2006 | Koga ......................... | 358/1.15 |
| 7,092,654 B2 | * | 8/2006 | Kurahashi et al. ............. | 399/82 |
| 7,127,471 B1 | * | 10/2006 | Wilson .................... | 707/103 R |
| 2002/0026550 A1 | * | 2/2002 | Suzuki et al. ............... | 710/104 |
| 2002/0091822 A1 | * | 7/2002 | Tsuchitoi .................... | 709/224 |
| 2002/0122201 A1 | * | 9/2002 | Haraguchi et al. ......... | 358/1.15 |

(Continued)

Primary Examiner—Madeleine A Nguyen
(74) Attorney, Agent, or Firm—Fitzpatrick, Cella, Harper & Scinto

(57) ABSTRACT

To provide a printer command control apparatus, method and system that can prevent control commands from being sent erroneously to a printer connected to a printer command control apparatus, a printer connected to the printer command control apparatus, and a program and a storage medium. In the printer command control system, a NonPC apparatus is connected to a printer and, at the same time, connected to a web server via the Internet. A tag to be sent from the NonPC apparatus to the printer is constituted by a printer maintenance command header, which consists of a header ID and a manufacturer ID including information indicating to which manufacturer a command is adapted, and a printer maintenance command. When manufacturer information of the manufacturer ID and manufacturer information of the printer do not coincide with each other, the printer maintenance command is controlled not to be sent to the printer.

20 Claims, 7 Drawing Sheets

U.S. PATENT DOCUMENTS

| | | | |
|---|---|---|---|
| 2002/0135800 A1* | 9/2002 | Dutta | 358/1.15 |
| 2002/0143936 A1* | 10/2002 | Yu | 709/224 |
| 2003/0033450 A1* | 2/2003 | Appleby-Alis | 710/8 |
| 2003/0035144 A1* | 2/2003 | Shima | 358/1.18 |
| 2003/0065755 A1* | 4/2003 | Gunji | 709/221 |
| 2003/0182367 A1* | 9/2003 | Ohara | 709/203 |
| 2004/0039811 A1* | 2/2004 | Nakamura et al. | 709/223 |
| 2004/0223185 A1* | 11/2004 | Yamada et al. | 358/1.15 |
| 2006/0028680 A1* | 2/2006 | Uchiyama et al. | 358/1.15 |
| 2006/0119888 A1* | 6/2006 | Shima | 358/1.15 |
| 2007/0050821 A1* | 3/2007 | Toshikage et al. | 725/62 |

* cited by examiner

FIG. 6

PRINTER MAINTENANCE COMMAND HEADER        PRINTER MAINTENANCE COMMAND

<A href="print-tricks:doprinterfunction?cxnonbjprintfunc=Set A=0 B=0 C=0 D=0 E=0 F=0">
                         HEADER ID  MAKER ID

TAG LINKED TO SET BUTTON OF HEAD POSITION ADJUSTMENT VALUE

FIG. 7

PRINTER MAINTENANCE COMMAND HEADER        PRINTER MAINTENANCE COMMAND

<A href="print-tricks:doprinterfunction?cxnonbjprintfunc=Print Head Alignment Pattern">
                         HEADER ID  MAKER ID

TAG LINKED TO HEAD POSITION ADJUSTMENT PATTERN PRINT BUTTON

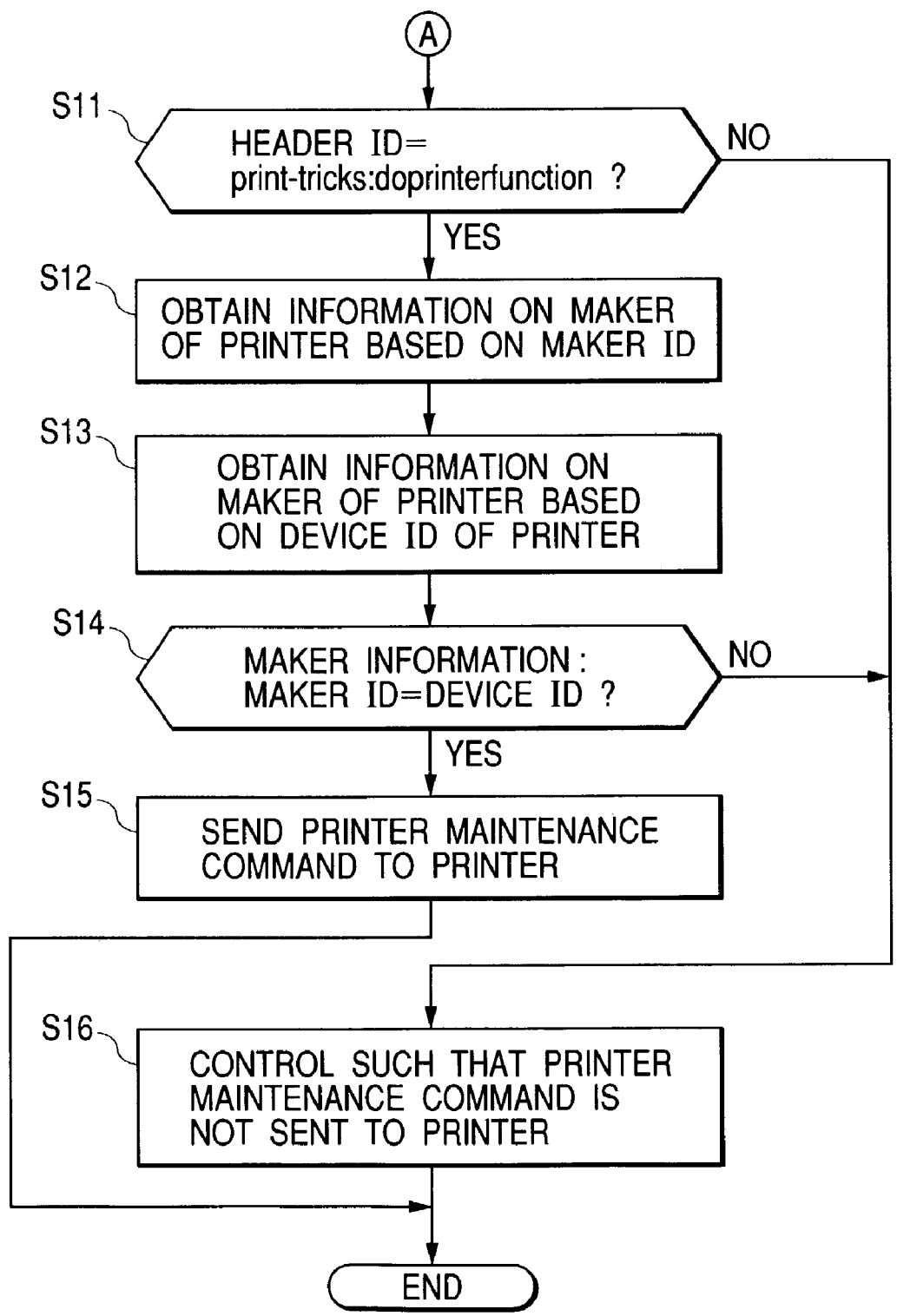

PRINTER COMMAND CONTROL APPARATUS, METHOD AND SYSTEM, PRINTER TO BE CONNECTED TO THE SAME APPARATUS, AND PROGRAM AND STORAGE MEDIUM

BACKGROUND OF THE INVENTION

1. Field of the Invention

The present invention relates to a printer command control apparatus, method and system, a printer to be connected to the printer command control apparatus, and a program and a storage medium, and in particular, to a printer command control apparatus, method and system for executing a command described with a tag of HTML, a printer to be connected to the printer command control apparatus, and a program and a storage medium.

2. Related Background Art

HTML (Hypertext Markup Language) as a page description language is used as a reserved word placed between "<" and ">" that is called a tag, and can perform shaping of a text, designation of a display position of an image file, or the like.

In order to browse a file in an HTML format accumulated in a web server on the Internet, a web browser program is required as software. This web browser program is devised so as to interpret a tag described in this HTML format and display contents of the file in the HTML format as a result of interpretation.

Examples of an apparatus representative as a NonPC apparatus that is generally called an Internet appliance include a "WebTV" and an "air-board" proposed by Sony Corporation. These appliances not only receive and display a general television broadcast but also may be provided with a web browser program therein, connected with a web server via the Internet, and have a web browsing function. Such a NonPC apparatus can be connected with a printer such as an ink-jet printer to print web contents. However, since the NonPC apparatus is not provided with the Windows (registered trademark) OS (operation system), it cannot operate complicated software as a PC apparatus does. For example, the NonPC apparatus such as the "air-board" runs based on a simple OS called VxWorks.

However, despite the fact that, in particular, it is essential for a NonPC apparatus connected to an ink-jet printer to apply maintenance processing such as cleaning and head alignment adjustment to the ink-jet printer when the ink-jet printer is used, a printer driver program to be installed in the NonPC apparatus is written simply. Thus, since the printer driver program is not provided with a user interface for printing specific to the ink-jet printer, the NonPC apparatus cannot apply the maintenance processing to the ink-jet printer.

Thus, a NonPC apparatus that is connected to the web server via the Internet and has a web browsing function is proposed, in which, in an attempt to embed a printer maintenance command peculiar to each printer manufacturer (hereinafter referred to as "manufacturer") in an HTML file provided with a complicated user interface like a Windows (registered trademark) driver, a web browser program is customized, whereby the embedded printer maintenance command peculiar to each manufacturer can be transmitted to an ink-jet printer.

In a NonPC apparatus operated by a simple OS that is not provided with the Windows (registered trademark) driver, a printer maintenance command can be embedded in an HTML file and this command can be sent to an ink-jet printer. However, since the printer maintenance command is peculiar to each manufacturer and, at the same time, a web browser program cannot edit data of an HTML format file, printer maintenance command are not compatible among manufacturers and are not unified. In addition, a printer maintenance command is constituted by a command header portion and a command portion, which do not include information for specifying a manufacturer. Thus, when an ink-jet printer of another manufacturer is connected to the NonPC apparatus due to some reason in a state in which an HTML file (display file) having, control commands such as a printer maintenance command embedded therein is held in the NonPC apparatus, control commands such as a printer maintenance command without compatibility may be erroneously sent to the ink-jet printer of another manufacturer.

In this case, since the ink-jet printer cannot understand the sent command, it has an inconvenience of performing so-called trash printing. In addition, since a control code for discharging sheets is not generally included in the printer maintenance command, a sheet cannot be discharged after the trash printing is performed, and the sheet is left in the ink-jet printer. Moreover, when the next printing begins, it is performed from the middle of the sheet left in the ink-jet printer, or as a result of occurrence of inconsistency of a command length, a plurality of sheets are discharged continuously.

SUMMARY OF THE INVENTION

It is an object of the present invention to provide a printer command control apparatus, method and system that can prevent control commands from being sent erroneously to a printer connected to a printer command control apparatus that holds a display file in which control commands are embedded, a printer connected to the printer command control apparatus, and a program and s storage medium.

In order to attain the above-mentioned object, the printer command control apparatus of the present invention is a printer command control apparatus provided with transmission means for sending a command to a printer, which is characterized by including storage means for storing a display file in which a printer control command is embedded, obtaining means for obtaining device identification information of the printer, and determination means for, if an instruction to issue a control command via a user interface screen displayed by the display file to be stored is made, determining whether the printer control command embedded in the display file is appropriate for a connected printer based on the device identification information obtained by the obtaining means, and characterized in that, when the printer control command embedded in the display file is determined to be not appropriate for the connected printer, the transmission means does not send the command to the printer.

In addition, the printer command control apparatus is characterized in that the obtaining means obtains device identification information including manufacturer information of the printer and obtains the manufacturer information of the printer included in the obtained device identification information.

In addition, the device identification information conforms to IEEE1284.

In addition, the printer command control apparatus is characterized in that the display file is described with a tag of HTML and the printer control command is added as a tag of HTML.

In addition, the printer command control apparatus is characterized by further including detection means for detecting the added tag, presuming means for presuming that the detected tag is not against a grammar of HTML, and control means for controlling inspection such that the added tag is not served for inspection and, at the same time, controlling printing such that the added tag is not served for printing.

In addition, the printer command control apparatus is characterized in that the determination means determines whether or not the manufacturer information of the printer included in the tag detected by the detection means and the obtained manufacturer information of the printer coincide with each other.

In addition, the printer command control apparatus is characterized in that the detection means detects a header and the manufacturer information of the printer following the header and, then, detects that the command is included in parts after the manufacturer information of the printer.

In addition, the printer command control apparatus is characterized in that the command consists of a printer maintenance command.

Further, the printer command control apparatus is characterized by consisting of a NonPC apparatus that runs with a low-function operation system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows a tag linked to a set button of a head position adjustment value associated with a set button 109 of a head position adjustment value of FIG. 2;

FIG. 7 shows a tag linked to a head position adjustment pattern print button associated with a head position adjustment pattern print button 102 of FIG. 2;

FIG. 9 is a flowchart of the printer maintenance command transmission processing executed by the NonPC apparatus 1 of FIG. 1.

DETAILED DESCRIPTION OF THE PREFERRED EMBODIMENTS

A printer command control system in accordance with an embodiment of the present invention will be described with reference to the accompanying drawings.

Figure 1:
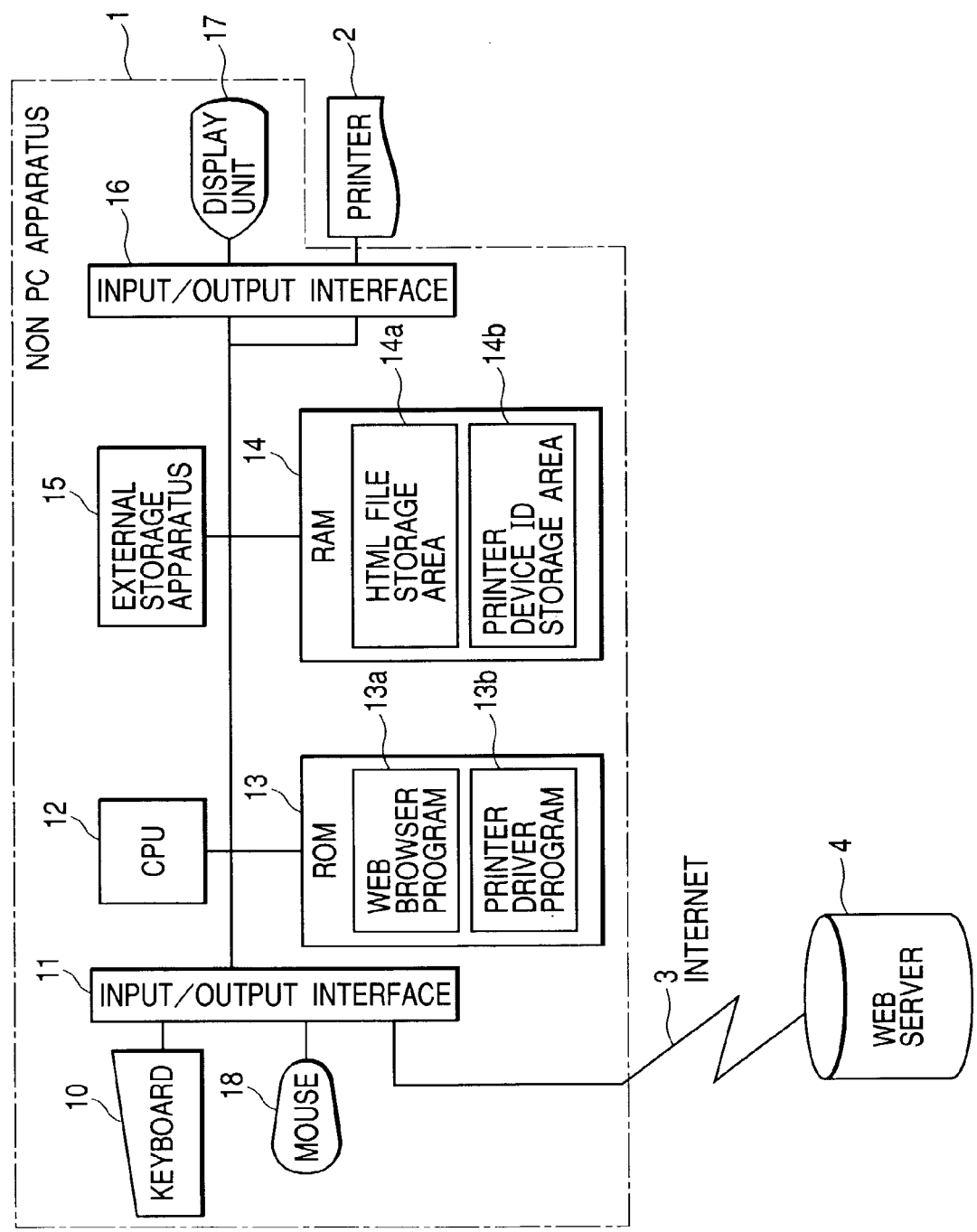
FIG. 1 is a block diagram of a print command control system in accordance with an embodiment of the present invention.

FIG. 1 is a block diagram of the print command control system in accordance with the embodiment of the present invention.

In FIG. 1, the print command control system consists of a NonPC apparatus 1 that can perform web browsing, a printer 2, the Internet 3, and a web server 4. The NonPC apparatus 1, which is a preferred embodiment of the print command control apparatus of the present invention, is provided with a USB interface serving as an input/output interface 16 and an input/output interface 11, and is connected to the printer 2 via the input/output interface 16 and, at the same time, connected to the web server 4 via the input/output interface 11 and the Internet 3. Here, although the input/output interface 16 is assumed to be the USB interface, it may be other interfaces such as a Centronics parallel interface. In addition, although the Internet 3 generally consists of a public telephone line, DSL or the like, it is not limited to these. Further, the input/output interface 11 can receive a television broadcast via a communication network not illustrated in the figure, and the NonPC apparatus 1 can apply data conversion to the television broadcast and display it on a display unit 17. Since data processing (signal processing) of a received television broadcast is known, its description will be omitted.

The NonPC apparatus 1 is provided with the display unit 17 connected to the NonPC apparatus 1 via the input/output interface 16, and a mouse 18 and a keyboard 10 serving as operation instruction system input means. The mouse 18 and the keyboard 10 are connected to the NonPC apparatus 1 via the input/output interface 11. In addition, the NonPC apparatus 1 is further provided with a CPU 12, an ROM 13, an RAM 14, and an external memory device 15. Although the operation instruction system input means is assumed to be the keyboard 10 and the mouse 18, it may be a touch pen when the display unit 17 is a display of a touch panel system.

The ROM 13 stores a web browser program 13a for causing the NonPC apparatus 1 to execute a web browse function operation and a printer driver program 13b for causing a printer connected to the NonPC apparatus 1 to execute a print operation.

The external memory device 15 consists of a hard disk, a FlashROM, or the like, and is generally used for saving an environment setting parameter for causing the NonPC apparatus 1 to operate and storing a browsing history of the web browser, and is also used as a cache.

The RAM 14 has an HTML file storage area 14a for downloading an HTML file to be displayed by a web browser from the Web server 4 and temporarily storing the HTML file and a printer Device ID storage area 14b for temporarily storing a Device ID (device identification information) of a printer currently connected to the NonPC apparatus 1. The printer Device ID storage area 14b obtains a Device ID of a printer 2, which is currently connected to the NonPC apparatus 1, conforming to IEEE1284 from the printer 2 and stores the Device ID temporarily. This Device ID includes manufacturer information of the printer 2.

Figure 2:
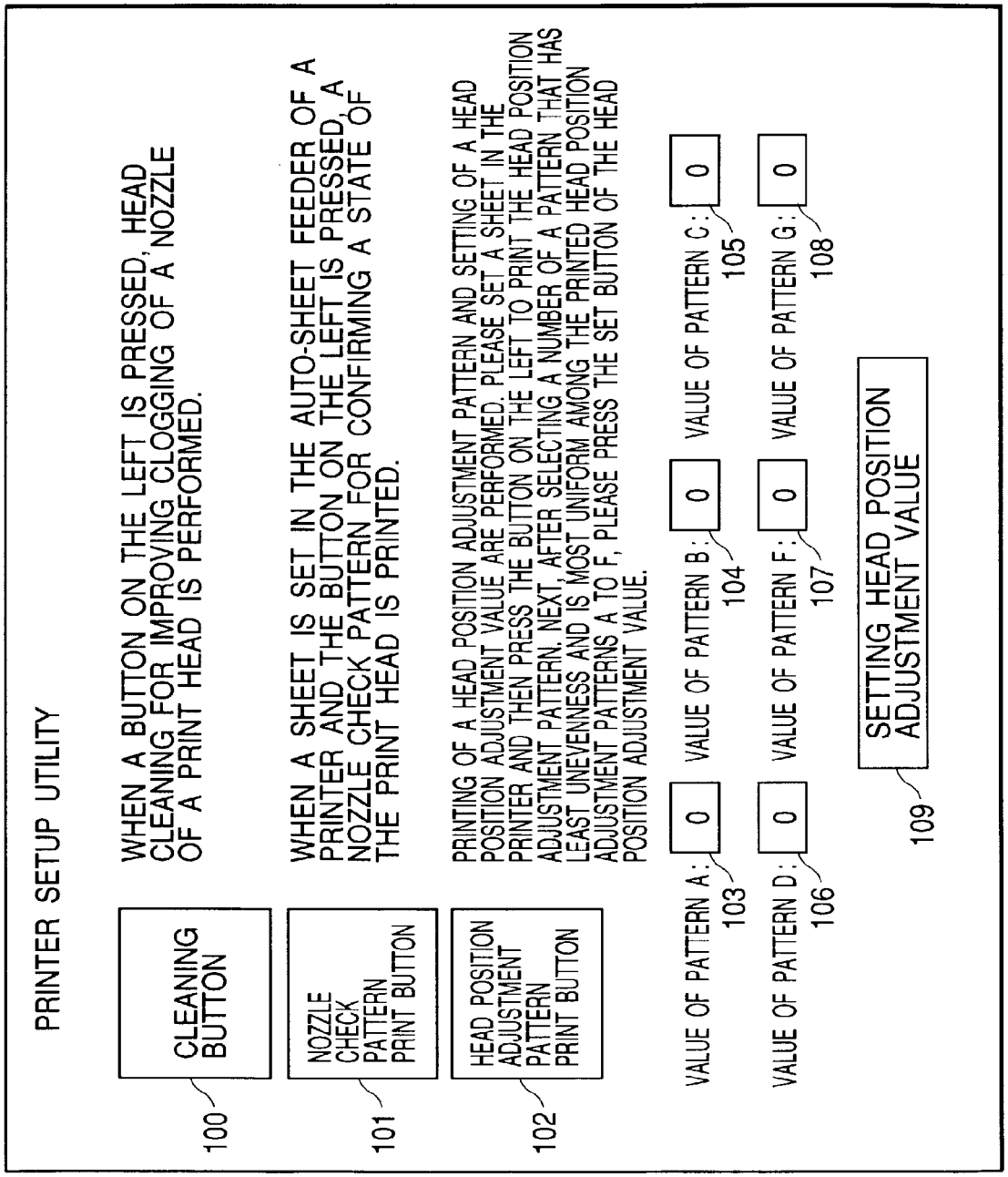
FIG. 2 shows a printer maintenance menu for executing printer maintenance processing displayed on a display unit 17 of FIG. 1.

FIG. 2 shows a printer maintenance menu for executing printer maintenance processing displayed on the display part 17 of FIG. 1. This display data is described in HTML and stored in the ROM 13 in advance. Control commands including a printer maintenance command or the like are embedded in this display data. In addition, the NonPC apparatus 1 can be constituted so as to download and obtain this display data anew from the Web server 4 via the Internet 3 and store it in the RAM 14.

Figure 4:
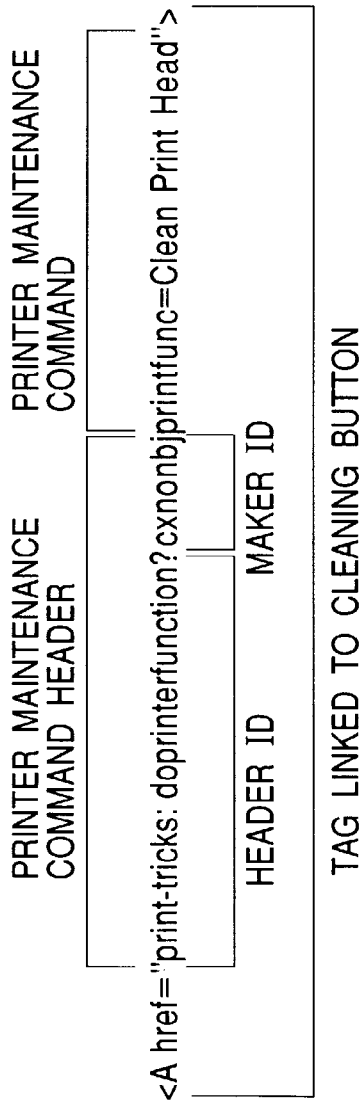
FIG. 4 shows a tag linked to a cleaning button associated with a cleaning button 100 of FIG. 2.

In FIG. 2, a cleaning button 100 consists of a button that is pressed when head cleaning for improving nozzle clogging of a printer head is executed. A tag linked to a cleaning button shown in FIG. 4 is associated with this cleaning button 100. When this cleaning button 100 is pressed, the web browser program 13a searches this associated tag linked to a cleaning button. When this tag linked to a cleaning button is found, the web browser program 13a reads out a printer maintenance command (control command) embedded therein and judges whether the printer maintenance command is correct as manufacturer information of a connected printer. If the printer maintenance command is correct, the web browser program 13a outputs an API (Application Program Interface) for causing a printer driver to apply through-processing to the printer maintenance command. The printer driver applies the through-processing to the maintenance command and outputs it to the printer 2 via the input/output interface 16. The printer 2 executes head cleaning of the printer 2 according to the printer maintenance command inputted via the input/output interface 16, which is a head cleaning command in this case.

Figure 5:
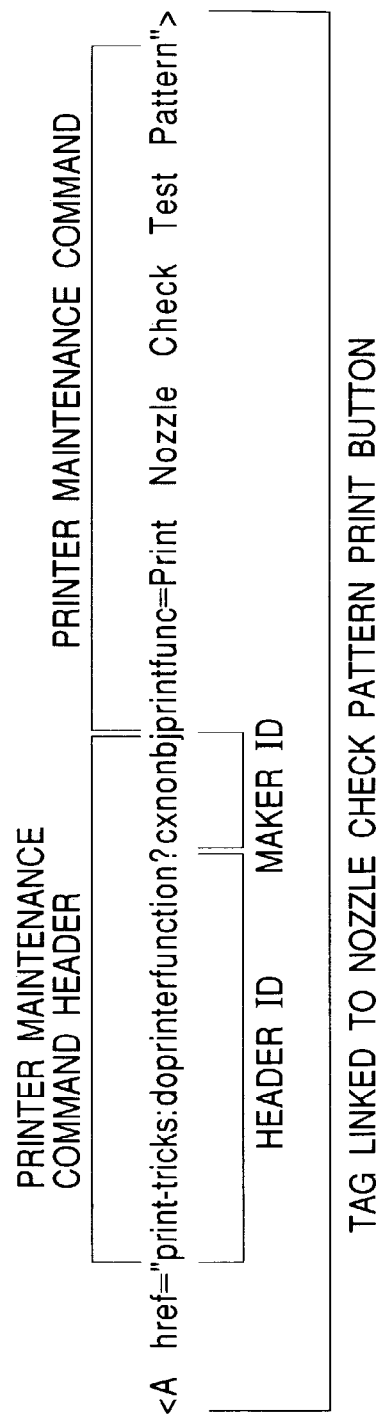
FIG. 5 shows a tag linked to a nozzle check pattern print button associated with a nozzle check pattern print button 101 of FIG. 2.

A nozzle check pattern print button 101 consists of a button that is pressed when a nozzle check pattern for checking a state of nozzle clogging and a degree of nozzle clogging of a print head is printed. A tag linked to a nozzle check pattern print button shown in FIG. 5 is associated with this nozzle check pattern print button 101. It is preferable to print this nozzle check pattern before printing a head position adjustment pattern discussed later because a state of nozzle clogging and a degree of clogging of a print head can be checked. If it is necessary to eliminate nozzle clogging, it is preferable to execute the above-mentioned head cleaning to improve the nozzle clogging.

A head position adjustment pattern print button 102 consists of a button that is pressed for printing a test pattern for performing position adjustment of a print head. A tag linked to a head position adjustment pattern print button shown in FIG. 6 is associated with this head position adjustment pattern print button 102. When the head position adjustment pattern print button 102 is pressed, a printer maintenance command is issued to the printer 2 via the printer driver program 13b. As a result, a head position adjustment pattern consisting of, for example, six kinds of patterns A to F as shown in FIG. 3 is printed.

Adjustment values discussed later are inputted in head position adjustment value input columns 103 to 108 for the printed patterns A to F, respectively, by pressing the head position adjustment pattern print button 102.

A set button 109 of a head position adjustment value consists of a button that is pressed for transferring values inputted in the head position adjustment value input columns 103 to 108 to the printer 2. A tag linked to a set button of a head position adjustment value (FIG. 6) is associated with this set button 109 of a head position adjustment value.

Figure 3:
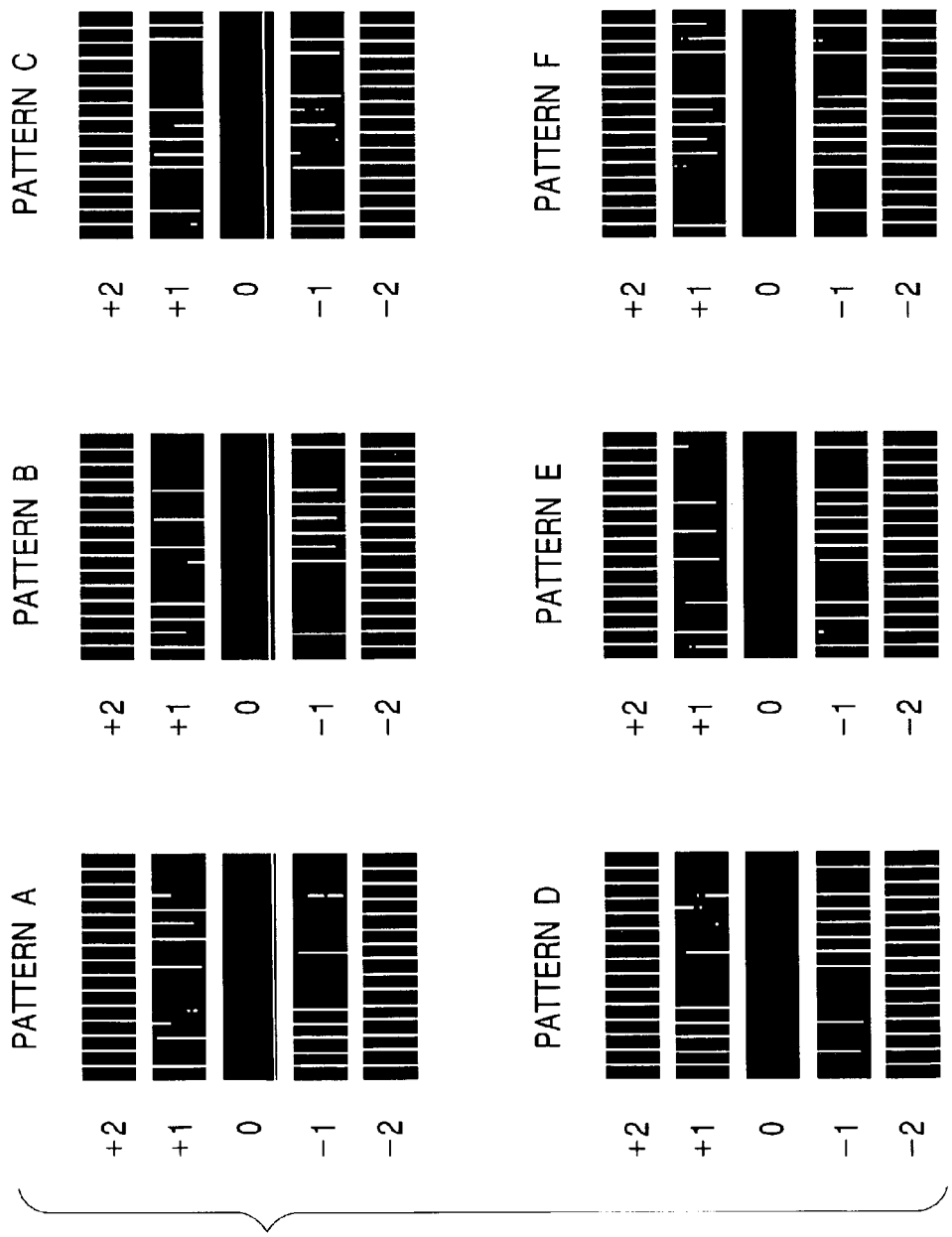
FIG. 3 shows head position adjustment patterns that are printed by pressing a head position adjustment pattern print button 102 of FIG. 2.

FIG. 3 shows head position adjustment patterns that are printed by pressing the head position adjustment pattern print button 102 of FIG. 2.

In FIG. 3, patterns with slightly changed adjustment values consisting of five kinds of adjustment values of +2 to −2 are further printed in each of the six kinds of patterns A to F that are printed by pressing the head position adjustment pattern print button 102 of FIG. 2. For each of the printed patterns A to F, an adjustment value with least conspicuous interference fringe is selected out of the five kinds of patterns and inputted in the head position adjustment value input columns 103 to 108 of FIG. 2. Since the number of patterns and the number of kinds of adjustment values in each pattern are not limited to those indicated above because the numbers depend on a type of the printer 2.

Tags associated with the buttons 100 to 102 and 109 of FIG. 2 will be hereinafter described with reference to FIGS. 4 to 7.

A printer maintenance command (control command) obtained by a tag for applying maintenance processing to the printer 2 is sent to the printer 2 from the NonPC apparatus 1.

In general, a control command to be sent from the NonPC apparatus 1 to the printer 2 is constituted by a printer maintenance command header for causing the printer 2 to execute maintenance processing when the control command is actually sent to the printer 2 and a printer maintenance command indicating contents of the maintenance processing such as cleaning and head alignment adjustment.

On the other hand, a printer maintenance command header in the tags described in the embodiments of the present invention is constituted by a special header ID and a special manufacturer ID, which are not regulated in the grammar of HTML, arranged in order (adding means, other adding means).

Such a special header ID cannot be interpreted by a general web browser program 13a. However, the web browser program 13a described in the embodiments of the present invention is changed so as not to consider that such a special header ID is against the grammar of HTML such that maintenance processing discussed later can be realized (presuming means, control means).

FIG. 4 shows a tag linked to a cleaning button associated with the cleaning button 100 of FIG. 2.

In FIG. 4, the tag linked to a cleaning button is constituted by a printer maintenance command header and a printer maintenance command for causing the printer 2 to execute cleaning as maintenance processing. The printer maintenance command header is constituted by a header ID and a manufacturer ID. The manufacturer ID includes information indicating to which printer manufacturer the printer maintenance command following it is adapted.

FIG. 5 shows a tag linked to a nozzle check pattern print button associated with the nozzle check pattern print button 101 of FIG. 2.

In FIG. 5, the tag linked to a nozzle check pattern print button is constituted by a printer maintenance command header and a printer maintenance command for causing the printer 2 to execute nozzle check pattern printing as maintenance processing. The printer maintenance command header is constituted by a header ID and a manufacturer ID. The manufacturer ID includes information indicating to which manufacturer the printer maintenance command following it is adapted.

FIG. 6 shows a tag linked to a set button of a head position adjustment value associated with the set button 109 of a head position adjustment value of FIG. 2.

In FIG. 6, the tag linked to a set button of a head position adjustment value is constituted by a printer maintenance command header and a printer maintenance command for setting a head position adjustment value in the printer 2 as maintenance processing. The printer maintenance command header is constituted by a header ID and a manufacturer ID. The manufacturer ID includes information indicating to which printer manufacturer the printer maintenance command following it is adapted. In addition, the printer maintenance command includes information on adjustment values inputted in the head position adjustment value input columns 103 to 108 of FIG. 2. As shown in FIG. 2, for example, 0 is inputted in all the head position adjustment value input columns 103 to 108, and 0 is set for each of the patterns A to F as information on adjustment values.

FIG. 7 shows a tag linked to a head position adjustment pattern print button associated with the head position adjustment pattern print button 102 of FIG. 2.

In FIG. 7, the tag linked to a head position adjustment pattern print button is constitute by a printer maintenance command header and a printer maintenance command for causing the printer 2 to execute position adjustment pattern printing as maintenance processing. The printer maintenance command header is constituted by a header ID and a manufacturer ID. The manufacturer ID includes information indicating to which print manufacturer the print maintenance command following it is adapted.

Figure 8:
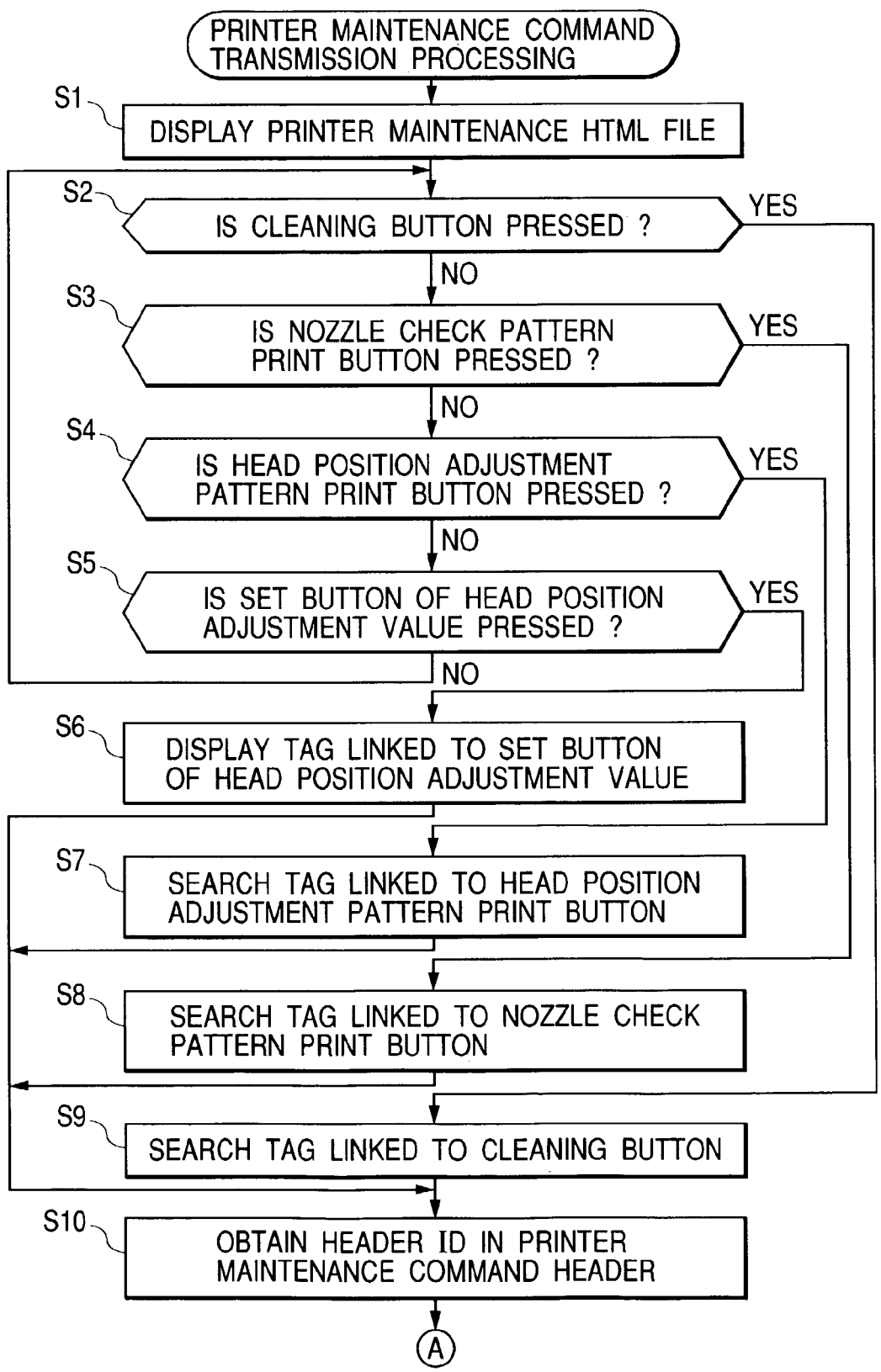
FIG. 8 is a flowchart of printer maintenance command transmission processing executed by a NonPC apparatus 1 of FIG. 1.

FIGS. 8 and 9 are flowcharts of printer maintenance command transmission processing executed by the NonPC apparatus 1 of FIG. 1.

In FIG. 8, first, the web browser program 13a loads a printer maintenance HTML file from the ROM 13 or from the web server 4 via the Internet 3 as described above, stores it in an HTLM file storage area 14a once, and displays a printer maintenance menu on the display unit 17 (step S1) (FIG. 2).

In the subsequent step S2, the web browser program 13a determines whether or not the cleaning button 100 is pressed on the displayed printer maintenance menu. When the cleaning button 100 is not pressed, the web browser program 13a advances to step S3. When the cleaning button 100 is pressed, the web browser program 13a searches and obtains the tag linked to a cleaning button shown in FIG. 4 that is included in the displayed HTML file and advances to step S10.

In step S3, the web browser program 13a determines whether or not the nozzle check pattern print button 101 is pressed. When the nozzle check pattern print button 101 is not pressed, the web browser program 13a advances to step S4. When the nozzle check pattern print button 101 is pressed, the web browser program 13a searches and obtains the tag linked to a nozzle check pattern print button shown in FIG. 5 that is included in the displayed HTML file and advances to step S10.

In step S4, the web browser program 13a determines whether or not the head position adjustment pattern print button 102 is pressed. When the head position adjustment pattern print button 102 is not pressed, the web browser program 13a advances to step S5. When the head position adjustment pattern print button 102 is pressed, the web browser program 13a searches and obtains the tag linked to a print button of a head position adjustment pattern shown in FIG. 6 that is included in the displayed HTML file and advances to step S10.

In step S5, the web browser program 13a determines whether or not the set button 109 of a head position adjustment value is pressed. When the set button 109 of a head position adjustment value is not pressed, the web browser program 13a returns to step S2 and repeats steps S2 to S5 until any one of the buttons 100 to 102 and 109 of FIG. 2 is pressed. When the set button 109 of a head position adjustment value is pressed, the web browser program 13a advances to step S6, searches and obtains the tag linked to a set button of a head position adjustment value shown in FIG. 6 that is included in the displayed HTML file and advances to step S10.

In step S10, the web browser program 13a searches and obtains a header ID in the printer maintenance command header from the tag obtained by the processing of any of steps S1 to S4 and, then, determines whether or not the obtained header ID coincides with "print-tricks:doprinterfunction?" indicating a printer maintenance command (step S11).

As a result of the determination of step S11, when the obtained header ID coincides with "print-tricks:doprinterfunction?", the web browser program 13a judges that this tag includes the printer maintenance command and advances to step S12. The web browser program 13a searches a manufacturer ID included in the printer maintenance command header from the obtained tag and obtains manufacturer information of the manufacturer ID. Then, the web browser program 13a obtains manufacturer information of the printer 2 from a Device ID of the printer 2 currently connected to the NonPC apparatus 1, which is stored in the Device ID storage area 14b (step S13).

The web browser program 13a determines whether or not the manufacturer information of the manufacturer ID obtained in step S12 and the manufacturer information of the printer 2 obtained in step S13 coincide with each other (step S14) (determination means).

As a result of the determination in step S14, when the manufacturer information of the manufacturer ID obtained in step S12 and the manufacturer information of the printer 2 obtained in step S13 coincide with each other, the web browser program 13a outputs the printer maintenance command included in the tag obtained by the processing of any of steps S1 to S4 using an API for causing the printer driver 13b to output a printer maintenance command through to the printer 2 (step S15). The printer driver 13b receives the API, directly sends the printer maintenance command passed from the web browser program 13a through to the printer 2 (transmission means), and causes the printer 2 to execute the maintenance processing to finish this processing.

When the obtained header ID does not coincide with "print-tricks:doprinterfunction?" and the web browser program 13a judges that this tag does not include the printer maintenance command (NO in step S11), or when the manufacturer information of the manufacturer ID obtained in step S12 and the manufacturer information of the printer 2 obtained in step S13 do not coincide with each other (NO in step S14), the web browser program 13a controls the printer maintenance command not to be sent to the printer 2 (step S16) (transmission means) to finish this processing.

Note that, although the processing of FIGS. 8 and 9 are described as executed by the web browser program 13a, the processing is not necessarily limited to this. In particular, the processing in or after step S10 of FIG. 8 may be realizable even if it is executed by a software module positioned in the middle between the web browser program 13a and the printer driver 13b.

According to the processing of FIGS. 8 and 9, when the manufacturer information of the manufacturer ID and the manufacturer information of the printer 2 do not coincide with each other (NO in step S14), the web browser program 13a controls the printer maintenance command not to be sent to the printer 2 (step S16). Thus, it is possible to prevent the printer maintenance command from being sent erroneously to the printer 2 that is a printer of another manufacturer.

Although the printer command control system consisting mainly of the NonPC apparatus 1 and the printer 2 is adopted in the above-mentioned embodiment, the printer command control system may be applied to a system constituted by a plurality of devices or an apparatus consisting of one device.

It is needless to mention that the object of the present invention can be attained by supplying a program of software realizing the functions of the above-described embodiment (program corresponding to the flowcharts of FIGS. 8 and 9) to a system, a computer of the system, or a CPU of the system, and the computer or the CPU reading out and executing the supplied program.

In this case, the above-mentioned program is directly supplied from a storage medium having the program recorded therein, or supplied by downloading from not-shown other computers, databases or the like connected to the Internet, a commercial network, a local area network, or the like.

In addition, the above-mentioned program only has to realize the functions of the above-described embodiment. A form of the program may consist of a form such as an object code, a program code executed by an interpreter, script data supplied to the OS, or the like.

Moreover, it is needless to mention that the object of the present invention can be attained by supplying a storage medium having stored therein a program of software for realizing the functions of the above-mentioned embodiment to a system, a computer of the system, or a CPU of the system, and the computer, or the CPU reading out to execute the program stored in the storage medium.

In the above-mentioned embodiment, the program is stored in the ROM 13. However, a storage medium for storing the program is not limited to an ROM but may be any medium as long as it can store the program such as an RAM, a NV-RAM, a floppy (trademark) disk, a hard disk, an optical disk, a magnet-optical disk, an MO, a CD-ROM, a CD-RW, a DVD-R, a DVD-ROM, a magnetic tape, a nonvolatile memory card, or other ROMs.

Note that the above-described program supplied by downloading may consist of a compressed program, or may be a file including an automatic install function in some cases. In addition, the program supplied by downloading may be a program code divided into a plurality of files. In this case, respective programs may be downloaded to separately. That is, a WWW server that downloads a program file realizing the functions of the above-described embodiment also constitutes the present invention.

In addition, the program to be supplied may be adapted such that an encrypted program is stored in a storage medium such as a CD-ROM and distributed to users, users who clear a predetermined condition are allowed to download key information for decrypting a code via the WWW server, and a code of the encrypted program is decrypted by using the key information.

Further, the functions of the above-described embodiment may be realized by an OS (operating system) or the like running on a computer executing a part or all of actual processing based on an instruction of a supplied program.

Moreover, the functions of the above-described embodiment may be realized by writing a program read out from a storage medium in a memory of a function extended board or a function extended unit provided in a computer, and the computer or a CPU provided with the function extended board or the function extended unit executing a part or all of actual processing based on an instruction of the written program.

As many apparently widely different embodiments of the present invention can be made without departing from the spirit and scope thereof, it is to be understood that the invention is not limited to the specific embodiments thereof except as defined in the appended claims.

As described above in detail, according to the present invention, when it is determined that a printer control command embedded in a display file is not appropriate for a connected printer, the printer control command is not sent to the printer. Thus, the command can be prevented from being sent erroneously to the connected printer. In addition, since a manufacturer of a printer is obtained from manufacturer information of the printer included in the printer driver, the manufacturer of the printer can be easily obtained.

In addition, according to the present invention, since manufacturer information of a printer included in device identification information obtained from the printer is obtained, a manufacturer of another printer can be easily obtained.

In addition, according to the present invention, since device identification information conforms to IEEE1284, the effect by the apparatus according to the second aspect of the present invention can be realized more easily.

In addition, according to the present invention, since a printer control command is added as a tag of HTML, a function of browsing an HTML file can be effectively utilized.

In addition, according to the present invention, since a header and manufacturer information of one printer following the header are detected and, then, it is detected that a command is included in parts after the manufacturer information of the printer, the effect by the apparatus according to the first aspect of the present invention can be realized surely.

In addition, according to the present invention, since a command consists of a printer maintenance command, maintenance processing can be applied to a printer.

In addition, according to the present invention, even if a printer command control apparatus consists of a NonPC apparatus, the effect according to the first aspect of the present invention can be realized.

Further, according to the present invention, since a command is not sent to a printer of a different manufacturer, an inconvenience of performing so-called trash printing can be eliminated surely. In addition, since the inconvenience of performing trash printing can be eliminated surely, a problem in that a sheet is left in an ink-jet printer, or a problem in that, when the next printing begins, a plurality of sheets are discharged continuously can be prevented from occurring.

What is claimed is:

1. A printer command control apparatus comprising:
    a storage unit adapted to store a display file in which a printer control command is embedded, wherein the printer control command includes manufacturer information of an appropriate printer and is embedded in a tag linked to an object on a user interface screen displayed by the display file;
    an obtaining unit adapted to obtain device identification information of a printer connected via a connection line, the device identification information including manufacturer information of the printer;
    a determination unit adapted to, if an instruction to issue a printer control command is made via the user interface screen displayed by the display file, determine whether the printer control command embedded in the display file is appropriate for the printer whose device identification information is obtained by said obtaining unit; and
    a transmission unit adapted to, if said determination unit determines that the printer control command embedded in the display file is appropriate for the printer whose device identification information is obtained by said obtaining unit, transmit the embedded printer control command to the printer, wherein, if said determination unit determines that the embedded printer control command is not appropriate for the printer, said transmission unit does not transmit the embedded printer control command to the printer,
    wherein said determination unit determines that the embedded printer control command is appropriate for the printer whose device identification information is obtained by said obtaining unit if the manufacturer information included in the device identification information obtained by said obtaining unit is identical to the manufacturer information of an appropriate printer included in the printer control command.

2. The printer command control apparatus according to claim 1, wherein the device identification information conforms to IEEE1284.

3. The printer command control apparatus according to claim 1, wherein the display file is described with a tag of HTML and the printer control command is added as a tag of HTML.

4. The printer command control apparatus according to claim 3, further comprising:

a detection unit adapted to detect the added tag;

a presuming unit adapted to presume that the detected tag is not against a grammar of HTML; and a control unit adapted to control inspection such that the added tag is not served for inspection and, at the same time, to control printing such that the added tag is not served for printing.

5. The printer command control apparatus according to claim 4, wherein said determination unit determines whether or not the manufacturer information of the printer included in the tag detected by said detection unit and the obtained manufacturer information of the printer coincide with each other.

6. The printer command control apparatus according to claim 5, wherein said detection unit detects a header and the manufacturer information of the printer following the header and, then, detects that the command is included in parts after the manufacturer information of the printer.

7. The printer command control apparatus according to claim 1, wherein the command consists of a printer maintenance command.

8. The printer command control apparatus according to claim 1, wherein the printer command control apparatus consists of a NonPC apparatus that runs with a low-function operation system.

9. A printer command control method for a printer command control apparatus provided with transmission step of sending a command to a printer, comprising the steps of:

storing a display file in which a printer control command is embedded, wherein the printer control command includes manufacturer information of an appropriate printer and is embedded in a tag linked to an object on a user interface screen displayed by the display file;

obtaining device identification information of a printer connected via a connection line, the device identification information including manufacturer information of the printer; and if an instruction to issue a printer control command is made via the user interface screen displayed by the display file, determining whether the printer control command embedded in the display file is appropriate for the printer whose device identification information is obtained in said obtaining step; and a transmitting step of, if said determinating step determines that the printer control command embedded in the display file is appropriate for the printer whose device identification information is obtained in said obtaining step, transmit the embedded printer control command to the printer, wherein, if said determining step determines that the embedded printer control command is not appropriate for the printer, said transmitting step does not transmit the embedded printer control command to the printer, wherein said determining step determines that the embedded printer control command is appropriate for the printer whose device identification information is obtained in said obtaining step if the manufacturer information included in the device identification information obtained in said obtaining step is identical to the manufacturer information of an appropriate printer included in the printer control command.

10. The printer command control method according to claim 9, wherein the device identification information conforms to IEEE1284.

11. The printer command control method according to claim 9, wherein the display file is described with a tag of HTML and the printer control command is added as a tag of HTML.

12. The printer command control method according to claim 11, further comprising the steps of:

detecting the added tag;

presuming that the detected tag is not against a grammar of HTML; and controlling inspection such that the added tag is not served for inspection and, at the same time, controlling printing such that the added tag is not served for printing.

13. The printer command control method according to claim 12, wherein, in said determination step, it is determined whether or not the manufacturer information of the printer included in the tag detected by said detection means and the obtained manufacturer information of the printer coincide with each other.

14. The printer command control method according to claim 13, wherein, in said detection step, a header and the manufacturer information of the printer following the header are detected and, then, it is detected that the command is included in parts after the manufacturer information of the printer.

15. The printer command control method according to claim 9, wherein the command consists of a printer maintenance command.

16. The printer command control method according to claim 9, wherein the printer command control apparatus consists of a NonPC apparatus that runs with a low-function operation system.

17. A printer command control program stored on computer-readable storage medium, the printer command control program for a printer command control apparatus provided with a transmission step of sending a command to a printer, comprising the program steps of:

storing a display file in which a printer control command is embedded, wherein the printer control command includes manufacturer information of an appropriate printer and is embedded in a tag linked to an object on a user interface screen displayed by the display file;

obtaining device identification information of a printer connected via a connection line, the device identification information including manufacturer information of the printer;

if an instruction to issue a printer control command is made via the user interface screen displayed by the display file, determining whether the printer control command embedded in the display file is appropriate for the printer whose device identification information is obtained in said obtaining step; and a transmitting step of, if said determining step determines that the printer control command embedded in the display file is appropriate for the printer whose device identification information is obtained in said obtaining step, transmit the embedded printer control command to the printer, wherein, if said determining step determines that the embedded printer control command is not appropriate for the printer, said transmitting step does not transmit the embedded printer control command to the printer, wherein said determining step determines that the embedded printer control command is appropriate for the printer whose device identification information is obtained in said obtaining step if the manufacturer information included in the device identification information obtained in said obtaining step is identical to the manufacturer information of an appropriate printer included in the printer control command.

18. A printer command control apparatus which controls a printer maintenance command for printer maintenance processing including a paper delivery, comprising:

- a storage unit adapted to store a display file in which the printer maintenance command received from an external Web server is embedded, wherein the printer maintenance command includes manufacturer information of a corresponding printer and is embedded in a tag linked to an object on a user interface screen displayed by the display file;
- an obtaining unit adapted to obtain device identification information of a printer connected via a connection line, the device identification information including manufacturer information of the printer;
- a determination unit adapted to, if the user interface screen is displayed by the display file stored in said storage unit via a Web browser and if an instruction to issue a printer maintenance command is made by designating the object on the user interface screen, determine whether the printer maintenance command embedded in the display file corresponds to the printer whose device identification information is obtained by said obtaining unit; and
- a transmission unit adapted to, if said determination unit determines that the printer maintenance command embedded in the display file corresponds to the printer whose device identification information is obtained by said obtaining unit, transmit the embedded printer maintenance command to the printer, wherein if said determination unit determines that the embedded printer maintenance command does not correspond to the printer, said transmission unit does not transmit the embedded printer maintenance command to the printer,
- wherein said determination unit determines that the embedded printer maintenance command corresponds to the printer whose device identification information is obtained by said obtaining unit if the manufacturer information included in the device identification information obtained by said obtaining unit is identical to the manufacturer information of a corresponding printer included in the printer maintenance command.

19. A method for a printer command control apparatus which controls a printer maintenance command for printer maintenance processing including a paper delivery, comprising:

- a storing step of storing a display file in which the printer maintenance command received from an external Web server is embedded, wherein the printer maintenance command includes manufacturer information of a corresponding printer and is embedded in a tag linked to an object on a user interface screen displayed by the display file;
- an obtaining step of obtaining device identification information of a printer connected via a connection line, the device identification information including manufacturer information of the printer;
- a determining step of, if the user interface screen is displayed by the display file stored in said storing step via a Web browser and if an instruction to issue a printer maintenance command is made by designating the object on the user interface screen, determining whether the printer maintenance command embedded in the display file corresponds to the printer whose device identification information is obtained in said obtaining step; and
- a transmitting step of, if said determining step determines that the printer maintenance command embedded in the display file corresponds to the printer whose device identification information is obtained in said obtaining step, transmitting the embedded printer maintenance command to the printer, wherein if said determining step determines that the embedded printer maintenance command does not correspond to the printer, said transmitting step does not transmit the embedded printer maintenance command to the printer,
- wherein said determining step determines that the embedded printer maintenance command corresponds to the printer whose device identification information is obtained said obtaining step if the manufacturer information included in the device identification information obtained in said obtaining step is identical to the manufacturer information of a corresponding printer included in the printer maintenance command.

20. A computer-readable medium storing a computer program for a printer command control apparatus which controls a printer maintenance command for printer maintenance processing including a paper delivery, said program comprising:

- a storing step of storing a display file in which the printer maintenance command received from an external Web server is embedded, wherein the printer maintenance command includes manufacturer information of a corresponding printer and is embedded in a tag linked to an object on a user interface screen displayed by the display file;
- an obtaining step of obtaining device identification information of a printer connected via a connection line, the device identification information including manufacturer information of the printer;
- a determining step of, if the user interface screen is displayed by the display file stored in said storing step via a Web browser and if an instruction to issue a printer maintenance command is made by designating the object on the user interface screen, determining whether the printer maintenance command embedded in the display file corresponds to the printer whose device identification information is obtained in said obtaining step; and
- a transmitting step of, if said determining step determines that the printer maintenance command embedded in the display file corresponds to the printer whose device identification information is obtained in said obtaining step, transmitting the embedded printer maintenance command to the printer, wherein if said determining step determines that the embedded printer maintenance command does not correspond to the printer, said transmitting step does not transmit the embedded printer maintenance command to the printer,
- wherein said determining step determines that the embedded printer maintenance command corresponds to the printer whose device identification information is obtained said obtaining step if the manufacturer information included in the device identification information obtained in said obtaining step is identical to the manufacturer information of a corresponding printer included in the printer maintenance command.

* * * * *